(12) United States Patent
Howes

(10) Patent No.: US 8,930,409 B2
(45) Date of Patent: Jan. 6, 2015

(54) SYSTEM AND METHOD FOR SUPPORTING NAMED OPERATIONS IN A DISTRIBUTED DATA GRID

(71) Applicant: Oracle International Corporation, Redwood Shores, CA (US)

(72) Inventor: Jason Howes, Somerville, MA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 13/671,356

(22) Filed: Nov. 7, 2012

(65) Prior Publication Data

US 2014/0108450 A1    Apr. 17, 2014

Related U.S. Application Data

(60) Provisional application No. 61/714,100, filed on Oct. 15, 2012.

(51) Int. Cl.
*G06F 17/30* (2006.01)

(52) U.S. Cl.
USPC .......................................................... 707/797

(58) Field of Classification Search
CPC ....................... G06F 11/1492; G06F 17/30575
USPC .......................................................... 707/966
See application file for complete search history.

(56) References Cited

U.S. PATENT DOCUMENTS

| | | |
|---|---|---|
| 5,014,265 A | 5/1991 | Hahne et al. |
| 5,301,350 A | 4/1994 | Rogan et al. |
| 5,561,785 A | 10/1996 | Blandy et al. |
| 5,784,698 A | 7/1998 | Brady et al. |
| 6,070,202 A | 5/2000 | Minkoff et al. |
| 6,338,112 B1 | 1/2002 | Wipfel et al. |
| 6,826,597 B1 | 11/2004 | Lonnroth et al. |
| 7,058,055 B2 | 6/2006 | Mugica et al. |
| 7,139,925 B2 | 11/2006 | Dinker et al. |
| 7,707,513 B2 | 4/2010 | Broda et al. |
| 7,861,249 B2 | 12/2010 | Jiang et al. |
| 8,024,445 B2 | 9/2011 | Kamijima et al. |
| 8,122,006 B2 | 2/2012 | de Castro Alves et al. |
| 8,131,894 B2 | 3/2012 | Cain et al. |
| 8,166,095 B2 | 4/2012 | Ferwerda et al. |
| 8,249,072 B2 | 8/2012 | Sugumar et al. |
| 8,271,980 B2 | 9/2012 | Jackson |
| 8,290,919 B1 | 10/2012 | Kelly et al. |
| 8,332,493 B2 | 12/2012 | Rowley et al. |
| 8,392,368 B1 | 3/2013 | Kelly et al. |

(Continued)

OTHER PUBLICATIONS

Tanenbaum, Andrew S., "*Modern operating systems*" Prentice-Hall, Inc., Upper Saddle River, New Jersey, 2001. 5 pages.

(Continued)

*Primary Examiner* — Baoquoc N To
(74) *Attorney, Agent, or Firm* — Meyer IP Law Group

(57) ABSTRACT

A system and method can support one or more named operations in a distributed data grid. The distributed data grid includes one or more cluster nodes that can provide the one or more named operations associated with one or more resources in the distributed data grid. The distributed data grid can publish the one or more named operations to a client. Furthermore, the distributed data grid can perform the one or more named operations in the distributed data grid upon receiving a request from a client.

20 Claims, 6 Drawing Sheets

(56) References Cited

U.S. PATENT DOCUMENTS

| | | |
|---|---|---|
| 8,510,376 B2 | 8/2013 | Kaczmarski et al. |
| 8,612,386 B2 | 12/2013 | Tien et al. |
| 8,621,031 B2 | 12/2013 | Desai |
| 8,768,981 B1 | 7/2014 | Milne et al. |
| 2004/0010674 A1 | 1/2004 | Boyd et al. |
| 2004/0083317 A1 | 4/2004 | Dickson et al. |
| 2004/0172618 A1 | 9/2004 | Marvin |
| 2005/0249215 A1 | 11/2005 | Kelsey et al. |
| 2006/0026169 A1 | 2/2006 | Pasqua |
| 2006/0112174 A1 | 5/2006 | L'Heureux et al. |
| 2006/0129516 A1 | 6/2006 | Bradford et al. |
| 2006/0161893 A1 | 7/2006 | Han et al. |
| 2006/0230128 A1 | 10/2006 | Chung et al. |
| 2007/0168336 A1 | 7/2007 | Ransil et al. |
| 2008/0208960 A1 | 8/2008 | Rowley et al. |
| 2009/0077233 A1 | 3/2009 | Kurebayashi et al. |
| 2009/0116484 A1 | 5/2009 | Buford |
| 2009/0177914 A1 | 7/2009 | Winchell |
| 2010/0005472 A1 | 1/2010 | Krishnaraj et al. |
| 2010/0017461 A1 | 1/2010 | Kokkevis et al. |
| 2010/0037222 A1 | 2/2010 | Tatsubori et al. |
| 2010/0042755 A1 | 2/2010 | Fuente et al. |
| 2010/0060934 A1 | 3/2010 | Bellert |
| 2010/0125624 A1 | 5/2010 | Bachhuber-Haller et al. |
| 2010/0265945 A1 | 10/2010 | Bejerano et al. |
| 2010/0333099 A1 | 12/2010 | Kupferschmidt et al. |
| 2011/0004701 A1 | 1/2011 | Panda et al. |
| 2011/0055322 A1 | 3/2011 | Gregerson |
| 2011/0137991 A1 | 6/2011 | Russell |
| 2011/0225120 A1 | 9/2011 | Cooper et al. |
| 2011/0225121 A1 | 9/2011 | Cooper et al. |
| 2011/0225122 A1 | 9/2011 | Denuit et al. |
| 2011/0246550 A1 | 10/2011 | Levari et al. |
| 2012/0113896 A1 | 5/2012 | Karol |
| 2012/0144025 A1 | 6/2012 | Melander et al. |
| 2012/0197840 A1* | 8/2012 | Oliver et al. .................. 707/613 |
| 2012/0197959 A1 | 8/2012 | Oliver et al. |
| 2012/0198455 A1 | 8/2012 | Lee et al. |
| 2012/0278398 A1 | 11/2012 | Lowekamp |
| 2012/0331029 A1 | 12/2012 | King, III et al. |
| 2013/0014114 A1 | 1/2013 | Nagata |
| 2013/0041969 A1 | 2/2013 | Falco et al. |
| 2013/0073809 A1 | 3/2013 | Antani et al. |
| 2013/0074101 A1 | 3/2013 | Oliver et al. |
| 2013/0103837 A1 | 4/2013 | Krueger |
| 2013/0128726 A1 | 5/2013 | Hellhake et al. |
| 2013/0262632 A1 | 10/2013 | Fein et al. |
| 2013/0325543 A1 | 12/2013 | Magee et al. |
| 2014/0016457 A1 | 1/2014 | Enyedi et al. |
| 2014/0219209 A1 | 8/2014 | Soneda et al. |

OTHER PUBLICATIONS

Andrew S. Tanenbaum, Computer Networks: Fourth Edition, Prentice Hall PTR, Upper Saddle River, NJ (2003), 6 pages.

Martin Sustrik, [zeromq-dev] Subports, Grokbase, Jul. 2011, 6 pages <http://grokbase.com/t/zeromq/zeromq-dev/117vwvr6z9/subports>.

Class Socketchannel, Java™ 2 Platform Standard Ed. 5.0, Copyright © 2004, 2010 Oracle Int'l Corp., 12 pages. <http://docs.oracle.com/javase/1.5.0/docs/api/java/nio/channels/SocketChannel.html>.

Tanenbaum, Andrew S., Computer Networks, Fourth Edition, 2003, Prentice Hall PTR, Chapter 5.2.7 Broadcast Routing.

* cited by examiner

SYSTEM AND METHOD FOR SUPPORTING NAMED OPERATIONS IN A DISTRIBUTED DATA GRID

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by inventors Robert H. Lee, Gene Gleyzer, Charlie Helin, Mark Falco, Ballav Bihani and Jason Howes, filed Oct. 15, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein is a system and method that can support one or more named operations in a distributed data grid. The distributed data grid includes one or more cluster nodes that can provide the one or more named operations associated with one or more resources in the distributed data grid. The distributed data grid can publish the one or more named operations to a client. Furthermore, the distributed data grid can perform the one or more named operations in the distributed data grid upon receiving a request from a client.

DETAILED DESCRIPTION

Figure 1:
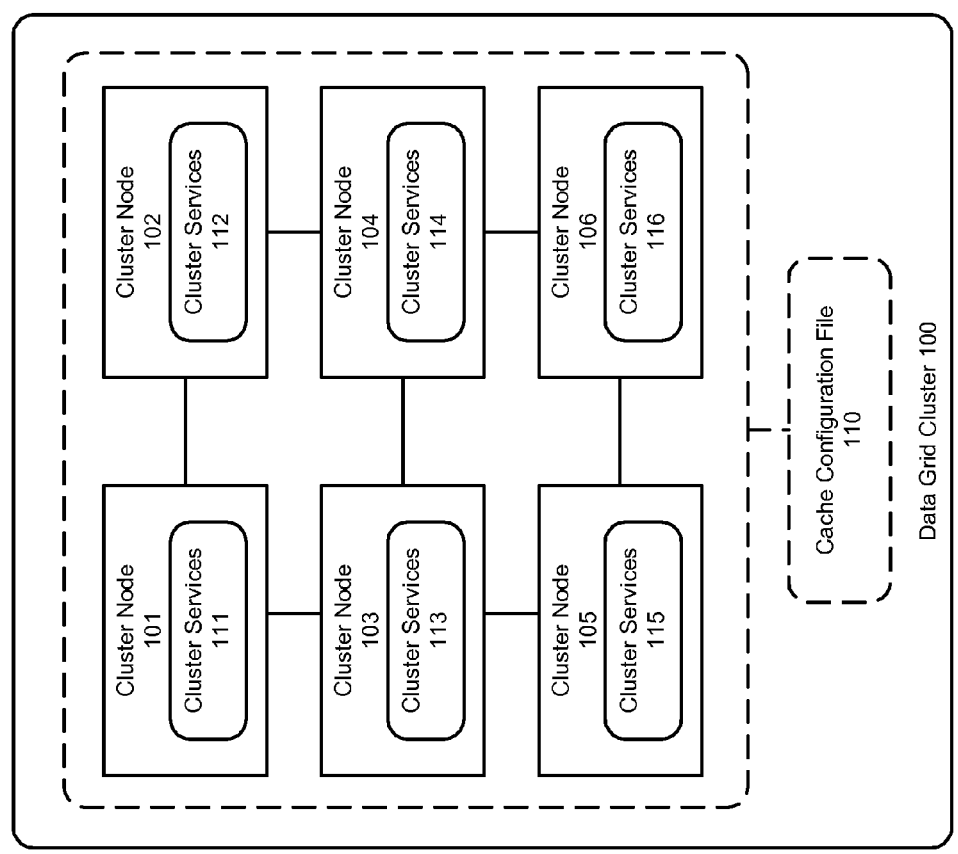
FIG. 1 is an illustration of a data grid cluster in accordance with various embodiments of the invention.

Described herein is a system and method that can support one or more named operations in a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG.

1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Named Operations

In accordance with an embodiment of the invention, different named operations can be supported in order to improve performance and ensure security in the distributed data grid. Such named operations can be performed, e.g. using named queries, named entry aggregator, and named entry processors.

Figure 2:
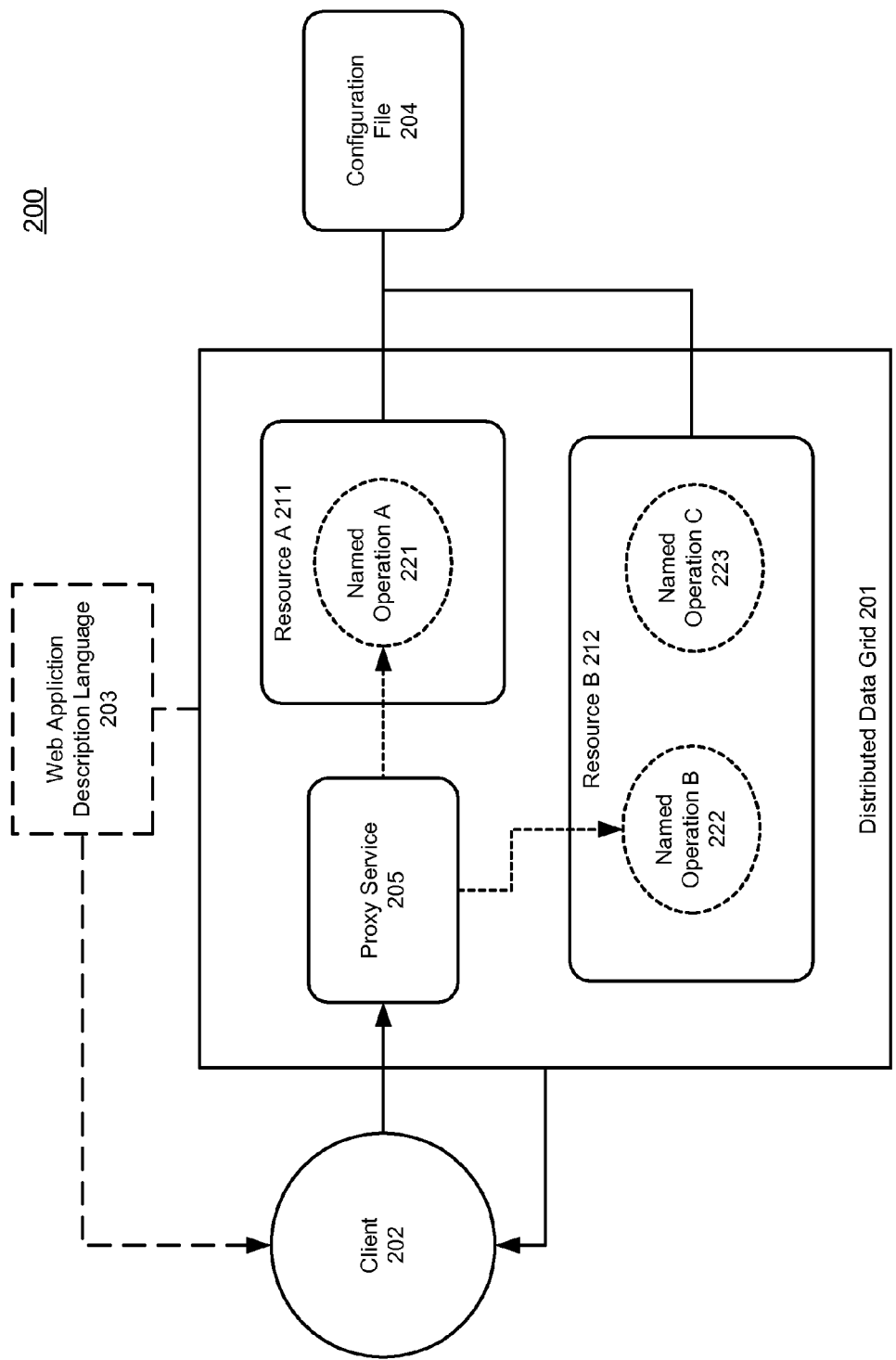
FIG. 2 shows an illustration of supporting one or more named operations in a distributed data grid in accordance with an embodiment of the invention.

FIG. 2 shows an illustration of supporting one or more named operations in a distributed data grid in accordance with an embodiment of the invention. As shown in FIG. 2, a distributed data grid 201 can support one or more resources, such as resources A-B 211-212. For example, a cache in Coherence can be a resource.

A resource A-B 211-212 in the distributed data grid 201 can be configured for a client 202 in a client-server environment 200 to perform one or more data grid operations. These data grid operations can include one or more named operations, e.g. named operations A-C 221-223. For example, resource A 211 supports a named operation A 221, while resource B 212 supports a named operation B 222 and a named operation C 223.

Furthermore, a configuration file 204, e.g. a cache configuration file in XML format, can be used to define each resource A-B 211-212 in the distributed data grid 201. The configuration file 204 can include definitions of the named operations A-C 221-223 for the different resources A-B 211-212 in the distributed data grid 201, and each named operation A-C 221-223 can be configured with a unique name.

The distributed data grid 201 can publish the one or more named operations A-C 221-223 to the client 202, e.g. using Web Application Description Language (WADL) 203, and allows the client 202 to request the performance of the available named operations 201-202, e.g. by name.

Additionally, the client 202 can access the distributed data grid 201 via a proxy service 205. The proxy service 205 can trigger the requested named operations, e.g. named operation A 221 on resource A 211 or named operation B 222 on resource B 212, on behalf of the client 202, after receiving a request from the client 202. Thus the proxy service 205 can address security concerns and help isolate the distributed data grid 201 from potentially untrusted clients.

The distributed data grid 201 can provide a response to the client 202 after performing the named operations. For example, when the request from the client is a Hypertext Transfer Protocol (HTTP) request, the distributed data grid 201 can provide a HTTP response back to the client 202.

In accordance with an embodiment of the invention, the client 202 can be a REpresentational State Transfer (REST) client that supports accessing a distributed data grid via a REST API. The REST API can include support for performing GET, PUT, and DELETE operations on a single object in a resource, e.g. a cache, for a REST client. On the other hand, the distributed data grid 201 can provide a REST service that implements the REST API in order to support the REST clients.

Furthermore, the REST services in the distributed data grid 201, such as the Coherence REST services, may require metadata about the cache that they expose. The metadata can include the key and value types for each cache entry, in addition to key converters and value marshallers. The distributed data grid 201 can use built-in converters and marshallers (with both XML and JSON supported) based on the associated key and value types.

For example, in Coherence, a user can edit the coherence-rest-config.xml file to define the key and value types for a cache entry. The user can include the <key-class> and the <value-class> elements within the <resource> element respectively. The following example defines a string key class and a value class for a Person user type:

```
<resources>
    <resource>
        <cache-name>person</cache-name>
        <key-class>java.lang.String</key-class>
        <value-class>example.Person<value-class>
    </resource>
</resources>
```

Named Query

Figure 3:
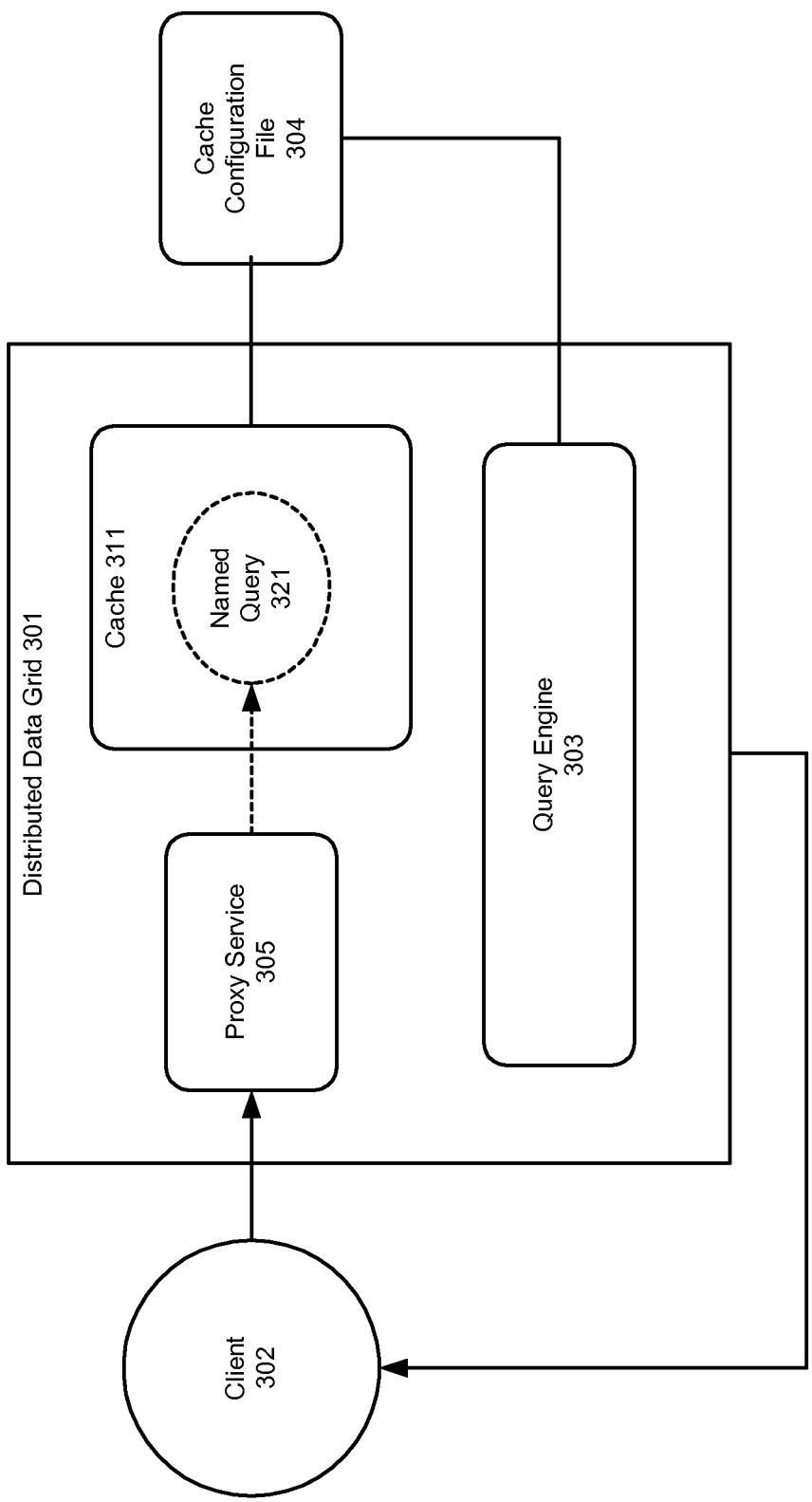
FIG. 3 shows an illustration of supporting a named query operation in a distributed data grid in accordance with an embodiment of the invention.

FIG. 3 shows an illustration of supporting a named query operation in a distributed data grid in accordance with an embodiment of the invention. As shown in FIG. 3, a client 302 in a client-server environment 300 can use a named query 321 to perform a query operation on a cache 311 in the distributed data grid 301 via a proxy service 305. Both the cache 311 and the named query 321 can be defined in a cache configuration file 304.

In Coherence, the named query 321 is a query expression that can be configured for a resource in the coherence-rest-config.xml file. The query expression can be specified as a Coherence Query Language (CohQL) expression, e.g. in the predicate part of CohQL. This expression can be configured in an XML file (e.g. all special characters (such as < and >) must be escaped using the corresponding entity).

A user can add any number of <query> elements within a <resource> element, in order to specify named queries. Each of the <query> elements can contain a query expression and name binding. The following example defines a named query for a cache:

```
<resource>
    <cache-name>persons</cache-name>
    <key-class>java.lang.Integer</key-class>
    <value-class>example.Person</value-class>
    <query>
        <name>minors</name>
        <expression>age < 18</expression>
    </query>
    <query>
        <name>name-query</name>
        <expression>name is :name</expression>
    </query>
</resource>
```

The following is an exemplary syntax for a named query 321. The named queries 321 can include context values as they may be required.

GET http://host:port/cacheName/namedQuery?param1=value1,param2=value2 . . .

For example, a user can enter the name of the query within the REST URL in order to use a named query 321. The following example uses the named query, minors, that is defined in the above example.

GET http://host:port/persons/minors

The parameters can provide flexibility by allowing context values to be replaced in the query expression. The following example uses the :name parameter that is defined in the name-query query expression above to only query entries whose name property is Mark.

GET http://host:port/persons/name-query?name=Mark

Additionally, the parameter names can be prefixed by a colon character (:paramName) in the query parameter definition. A user can specify type hints as part of a query parameter definition (:paramName; int), in the case when parameter bindings do not have access to type information.

In accordance with an embodiment of the invention, the distributed data grid 301 allows a client to use direct queries, in addition to the named queries. In Coherence, direct queries are query expressions that can be submitted as the value of the parameter q in a REST URL. The query expression can be specified as a URL-encoded CohQL expression (the predicate part of CohQL). Direct queries, which may be disabled by default as a security measure, can be enabled by adding a <direct-query> element for each resource to be queried and setting the enabled attribute to true in the coherence-rest-config.xml file.

Furthermore, the distributed data grid 301 can use a query engine 303 to execute queries for both direct and named queries. This query engine 303 can be either a default query engine or a custom query engine. In Coherence, a default query engine can execute queries that are expressed using a CohQL syntax (the predicate part of CohQL). Additionally, a custom query engine can be used to perform the named query operation on the distributed data grid 301.

The custom query engine allows the use of different query expression syntaxes or the ability to execute queries against data source other than Coherence (for example, to query a database for entries that are not present in a cache). Custom query engines can implement a query interface, such as the com.tangosol.coherence.rest.query.QueryEngine and com.tangosol.coherence.rest.query.Query interfaces In Coherence. Additionally, custom implementations can also extend the com.tangosol.coherence.rest.query.AbstractQueryEngine base class, which provides convenient methods for parsing query expression and handling parameter bindings. The base class supports parameter replacement at execution time and type hints that can be submitted as part of the query parameter value. Both parameter names and type hints follow the CohQL specification and can be used for other query engine implementations.

Custom query engines can be enabled in the coherence-rest-config.xml file. The following example defines a custom query engine.

```
<query-engines>
    <engine>
        <name>SQL-ENGINE</name>
        <class-name>package.SqlQueryEngine</class-name>
    </engine>
</query-engines>
```

As shown in the above, a user can register the custom query engine implementation by adding an <engine> element, within the <query-engines> element in the coherence-rest-config.xml file to enable a custom query engine 303. The <engine> element can include a name for the query engine and the fully qualified name of the implementation class.

Furthermore, a user can use DEFAULT as the registered name to make a query engine the default custom query engine. Additionally, a user can add the engine attribute, within a <direct-query> element or a <query> element, that refers to the custom query engine's registered name, in order to explicitly specify a custom query engine for a named query or a direct query.

Named Entry Aggregator

Figure 4:
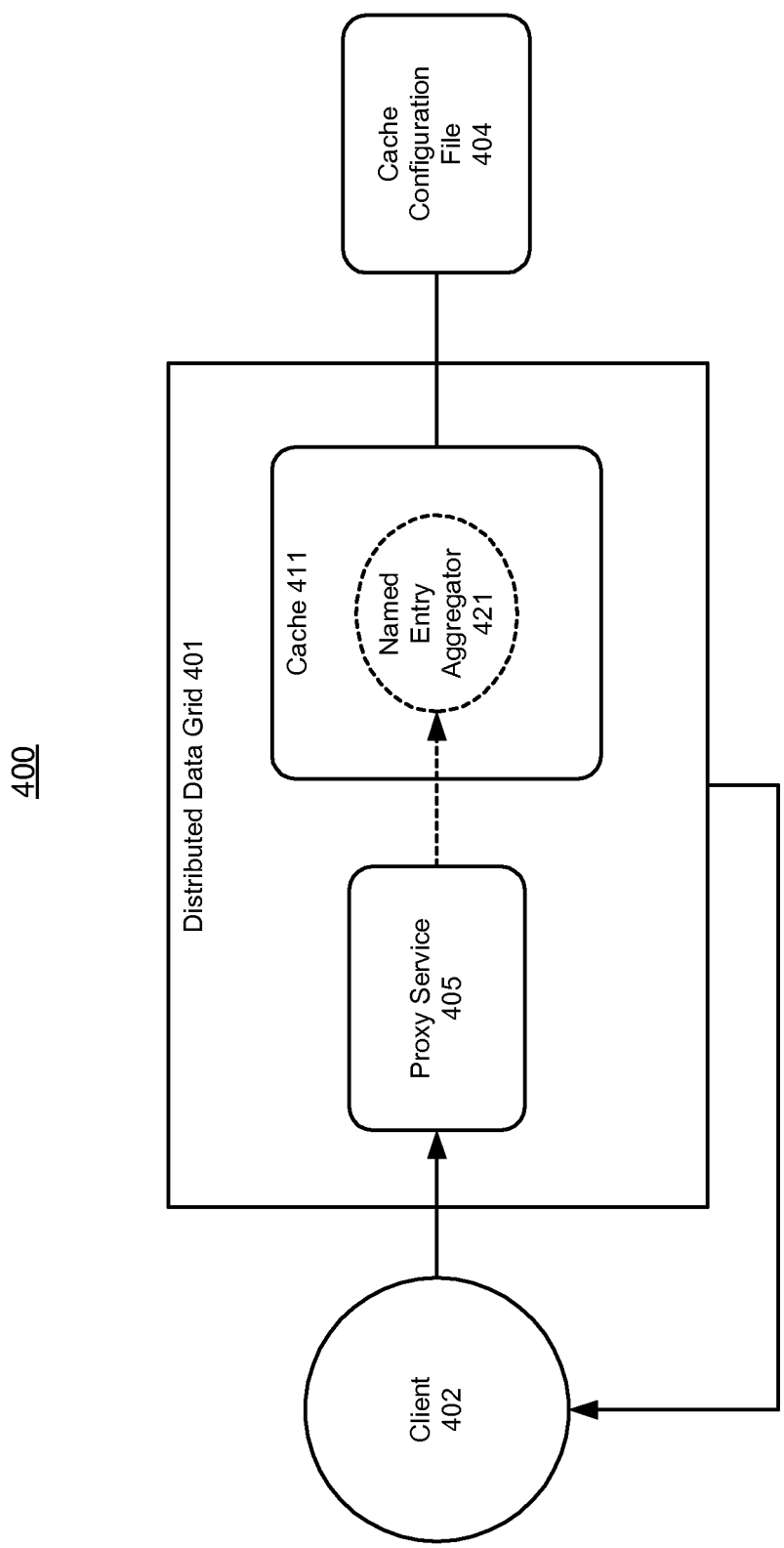
FIG. 4 shows an illustration of supporting a named entry aggregator in a distributed data grid in accordance with an embodiment of the invention.

FIG. 4 shows an illustration of supporting a named entry aggregator in a distributed data grid 401 in accordance with an embodiment of the invention. As shown in FIG. 4, a client 402 in a client-server environment 400 can use a named entry aggregator 421 to perform an entry aggregation operation on data in a cache 411 in the distributed data grid 401 via a proxy service 405. Both the cache 411 and the associated named entry aggregator 421 can be defined in the cache configuration file 404.

A named entry aggregator can aggregate all entries in the cache, query results (e.g. specified as a URL-encoded CohQL expression), or specified entries. For example, Coherence REST can provide a set of pre-defined entry aggregators and also can allow custom entry aggregators to be created as required.

The following examples demonstrate how to perform entry aggregations using REST.

Aggregate all entries in the cache.
GET http://host:port/cacheName/aggregator(args, . . . )
Aggregate query results.
GET http://host:port/cacheName/aggregator (args, . . . )?q=query
Aggregate specified entries.
GET http://host:port/cacheName/(key1, key2, . . . )/aggregator(args, . . . )

If the entry aggregation succeeds, a 200 (OK) status code can be returned with the aggregation result as an entity.

In accordance with an embodiment of the invention, the distributed data grid 401 can provide a simple strategy for entry aggregator creation, e.g. based on entry aggregator related URL segments. Coherence REST can resolve any registered (either built-in or user registered) entry aggregator with a constructor that accepts a single parameter of type com.tangosol.util.ValueExtractor (e.g. LongMax and DoubleMax). If an entry aggregator call within a URL does not contain any parameters, the entry aggregator can be created using com.tangosol.util.extractor.IdentityExtractor. If an entry aggregator segment within the URL does not contain any parameters nor a constructor accepting a single ValueExtractor exists, Coherence REST can instantiate the entry aggregator using a default constructor which is the desired behavior for some built-in aggregators (such as count).

Furthermore, custom entry aggregator types can be defined by specifying a name to be used in the REST URL and a class implementing a special interface, e.g. either the com.tangosol.util.InvocableMap. EntryAggregator interface or the com.tangosol.coherence.rest.util.aggregator.AggregatorFactory interface.

Here, an EntryAggregator implementation can be used for simple scenarios when entry aggregation is either performed on single property or on a cache value itself. An AggregatorFactory interface can be used when a more complex creation strategy is required. The implementation can resolve the URL segment containing entry aggregator parameters and use the parameters to create the appropriate entry aggregator.

The custom entry aggregators can be configured in the coherence-rest-config.xml file within the <aggregators> elements.

The following example configures both a Custom EntryAggregator implementation and a Custom AggregatorFactory implementation:

```
<aggregators>
    <aggregator>
        <name>my-simple-aggr</name>
        <class-name>com.foo.MySimpleAggregator</class-name>
    </aggregator>
    <aggregator>
        <name>my-complex-aggr</name>
        <class-name>com.foo.MyAggreagatorFactory</class-name>
    </aggregator>
</aggregators>
```

Named Entry Processor

Figure 5:
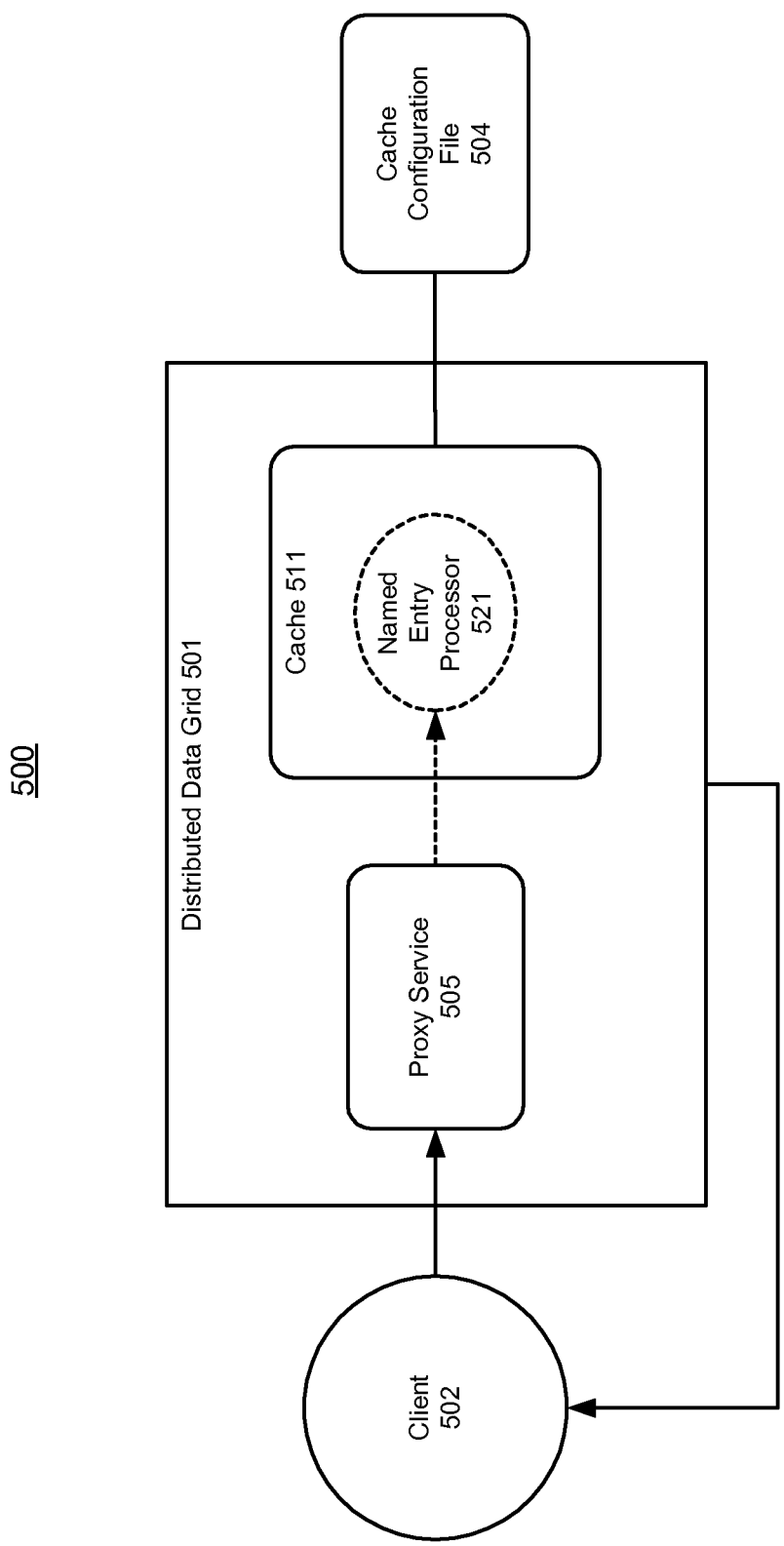
FIG. 5 shows an illustration of supporting a named entry processor in a distributed data grid in accordance with an embodiment of the invention.

FIG. 5 shows an illustration of supporting a named entry processor 521 in a distributed data grid 501 in accordance with an embodiment of the invention. As shown in FIG. 5, a client 502 in a client-server environment 500 can use a named entry processor 521 to perform an entry process operation on one or more objects in a cache 511 in the distributed data grid 501 via a proxy service 505. Both the cache and the associated named entry processor 521 can be defined in a configuration file 504.

A named entry processor 521 can process all entries in the cache, query results, or specified entries. For example, Coherence REST includes a set of pre-defined entry processors and custom entry processors can be created as required.

The following examples demonstrate how to perform entry processing using REST.

Process all entries in the cache.
POST http://host:port/cacheName/processor(args, . . . )
Process query results.
POST http://host:port/cacheName/processor (args, . . . )?q=query
Process specified entries.
POST http://host:port/cacheName/(key1, key2, . . . )/processor (args, . . . )

If the processing succeeds, a 200 (OK) status code returns with the processing result as an entity.

In order to define an entry processor, a user can specify the name of the entry processor class directly in the configuration, in a fashion similar to defining entry aggregators. Additionally, the entry processor definition can be based on a factory approach.

For example, a ProcessorFactory interface can be used to handle an input string from a URL section and instantiate the processor instance, since the entry processors 521 can have more diverse creation patterns than the entry aggregators 421. For example, Coherence REST can provide two such factories for NumberIncrementor and NumberMultiplier, each of which can be an implementation of a special interface, e.g. the com.tangosol.coherence.restutil.processor.ProcessorFactory interface. Additionally, custom entry processors can be defined by specifying a name to be used in a REST URL and a class that implements the com.tangosol.coherence.rest.util.processor.ProcessorFactory interface.

The custom entry processors can be configured in the coherence-rest-config.xml file within the <processors> elements. The following example configures a custom ProcesorFactory implementation:

```
<processors>
    <processor>
        <name>my-processor</name>
        <class-name>com.foo.MyProcessorFactory</class-name>
    </processor>
</processors>
```

Figure 6:
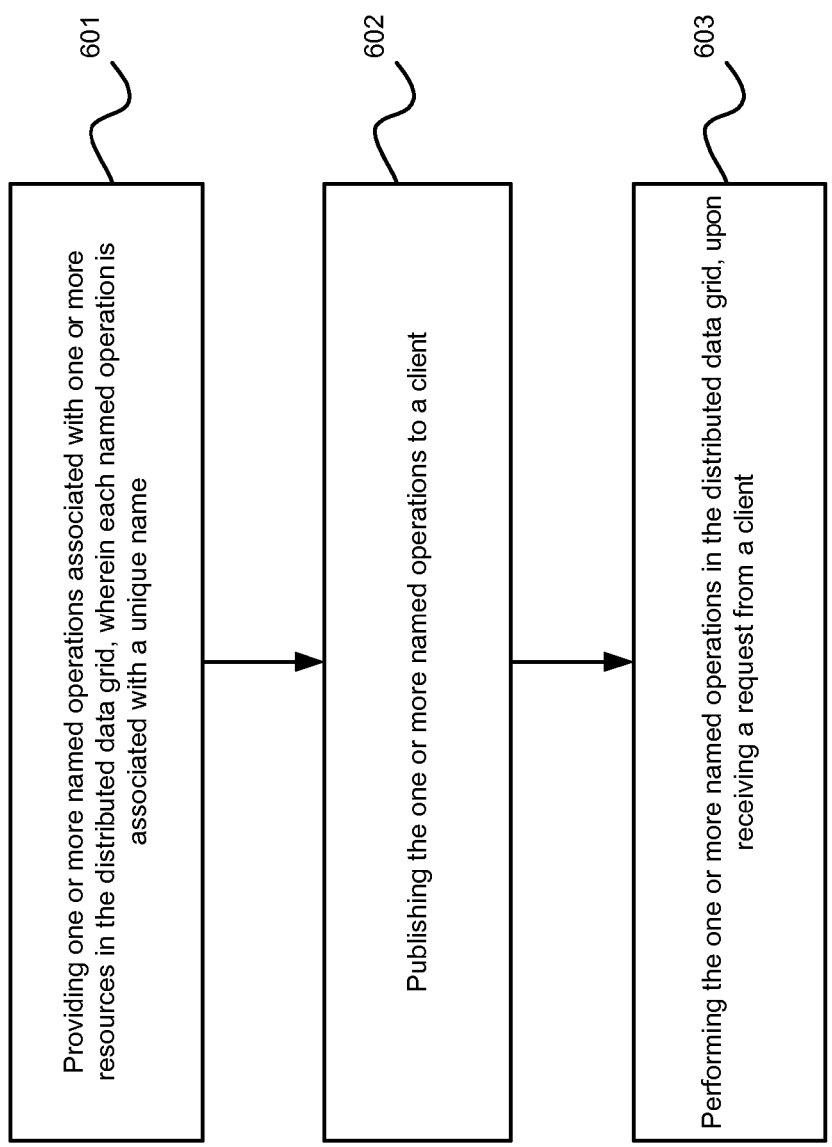
FIG. 6 illustrates an exemplary flow chart for one or more named operations in a distributed data grid in accordance with an embodiment of the invention.

FIG. 6 illustrates an exemplary flow chart for one or more named operations in a distributed data grid in accordance with an embodiment of the invention. As shown in FIG. 6, at step 601, the distributed data grid can provide one or more named operations associated with one or more resources in the distributed data grid, wherein each named operation is associated with a unique name. Then, at step 602, the distributed data grid can publish the one or more named operations to a client. Finally, at step 603, the distributed data grid can perform the one or more named operations in the distributed data grid, upon receiving a request from a client.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting a plurality of named operations in a distributed data grid operating on one or more microprocessors, comprising:
    defining the plurality of named operations associated with one or more resources in the distributed data grid;
    associating each of the plurality of named operations with a unique name;
    publishing the plurality of named operations to a web client external to the distributed data grid; and
    receiving a request from a said web client external to the distributed data grid, wherein the request includes a particular unique name of a particular one of said plurality of named operations;
    performing the particular one of the plurality of named operations in the distributed data grid, in response to said request from said web client.

2. The method according to claim 1, further comprising:
    defining each of the plurality of named operations in a configuration file for the one or more resources in the distributed data grid.

3. The method according to claim 1, further comprising:
    allowing the web client to be a REpresentational State Transfer (REST) client,
    allowing the request from the web client to be a Hypertext Transfer Protocol (HTTP) request which includes the particular unique name of the particular one of said plurality of named operations as part of a Uniform Resource Locator (URL), and
    providing an HTTP response to the web client after performing the particular one of the plurality of named operations in the distributed data grid.

4. The method according to claim 1, further comprising:
providing a response to the client after performing the particular one of the plurality of named operations in the distributed data grid.

5. The method according to claim 1, further comprising:
providing a proxy service;
receiving said request with the proxy service; and
triggering said performing of said particular one of the plurality of named operations using said proxy service.

6. The method according to claim 1, wherein:
one of said plurality of named operations is a named query operation having a unique query name, and said request includes said unique query name; and
wherein said performing step comprises using a custom query engine to perform the named query operation on the one or more resources in the distributed data grid in response to said request.

7. The method according to claim 1, wherein:
wherein said performing step comprises using a custom query engine to perform the particular one of the plurality of named operations on the one or more resources in the distributed data grid.

8. The method according to claim 1, further comprising:
allowing at least one of said plurality of named operations to be performed using a named entry aggregator.

9. The method according to claim 1, further comprising:
allowing at least one of said plurality of named operations to be performed using a named entry processor.

10. The method according to claim 1, further comprising:
publishing the plurality of named operations to the client using a Web Application Description Language (WADL).

11. A system for supporting a plurality of pre-defined operations in a distributed data grid, comprising:
one or more microprocessors;
one or more cluster nodes in the distributed data grid running on the one or more microprocessors, wherein the one or more cluster nodes are configured to
define the plurality of named operations associated with one or more resources in the distributed data grid,
associate each of the plurality of named operations with a unique name,
publish the plurality of named operations to a web client external to the distributed data grid,
receive a request from said web client external to the distributed data grid, wherein the request includes a particular unique name of a particular one of said plurality of named operations, and
perform the particular one of the plurality of named operations in the distributed data grid, in response to said request from said web client.

12. The system according to claim 11, wherein:
the plurality of named operations are each defined in a configuration file for the one or more resources in the distributed data grid.

13. The system according to claim 11, wherein:
the client is a REST client, and wherein the request from the client is a HTTP request which includes the particular unique name of the particular one of said plurality of named operations as part of a Uniform Resource Locator (URL), and
wherein the one or more cluster nodes are further configured to provide an HTTP response to the web client after performing the particular one of the plurality of named operations in the distributed data grid.

14. The system according to claim 11, wherein:
the one or more cluster nodes are configured to provide a response to the client after performing the particular one of the plurality of named operations in the distributed data grid.

15. The system according to claim 11, further comprising:
a proxy service;
wherein said proxy service is configured to receive said request and trigger said performing of said particular one of the plurality of named operations using said proxy service.

16. The system according to claim 11, wherein:
one named operation of said plurality of named operations is a named query operation having a unique query name, and said request includes said unique query name;
wherein said one or more cluster nodes are configured to use a custom query engine to perform the named query operation on the one or more resources in the distributed data grid in response to said request which includes said unique query name.

17. The system according to claim 16, wherein:
said one or more cluster nodes are configured to use a custom query engine in the distributed data grid in response to said request which includes said particular unique name.

18. The system according to claim 11, wherein:
one of said plurality of named operations is performed using a named entry aggregator.

19. The system according to claim 11, wherein:
one of said plurality of named operations is performed using a named entry processor.

20. A non-transitory machine readable storage medium having instructions stored thereon for supporting a plurality of named operations in a distributed data grid, which instructions, when executed, cause a system to perform steps comprising:
defining the plurality of named operations associated with one or more resources in the distributed data grid;
associating each of the plurality of named operations with a unique name;
publishing the plurality of named operations to a web client external to the distributed data grid; and
receiving a request from said web client external to the distributed data grid, wherein the request includes a particular unique name of a particular one of said plurality of named operations;
performing the particular one of the plurality of named operations in the distributed data grid, in response to said request from said web client.

* * * * *

UNITED STATES PATENT AND TRADEMARK OFFICE
CERTIFICATE OF CORRECTION

PATENT NO. : 8,930,409 B2  
APPLICATION NO. : 13/671356  
DATED : January 6, 2015  
INVENTOR(S) : Howes Page 1 of 1

It is certified that error appears in the above-identified patent and that said Letters Patent is hereby corrected as shown below:

In the Drawings

On sheet 2 of 6, in figure 2, under Reference Numeral 203, line 1, delete "Appliction" and insert -- Application --, therefor.

In the Claims

In column 8, line 46, in Claim 1, after "from" delete "a".

Signed and Sealed this  
Eighth Day of September, 2015

Michelle K. Lee  
*Director of the United States Patent and Trademark Office*